Dec. 15, 1925.
M. M. MOORE ET AL
MOVING PICTURE CAMERA
Filed May 31, 1921
1,565,488
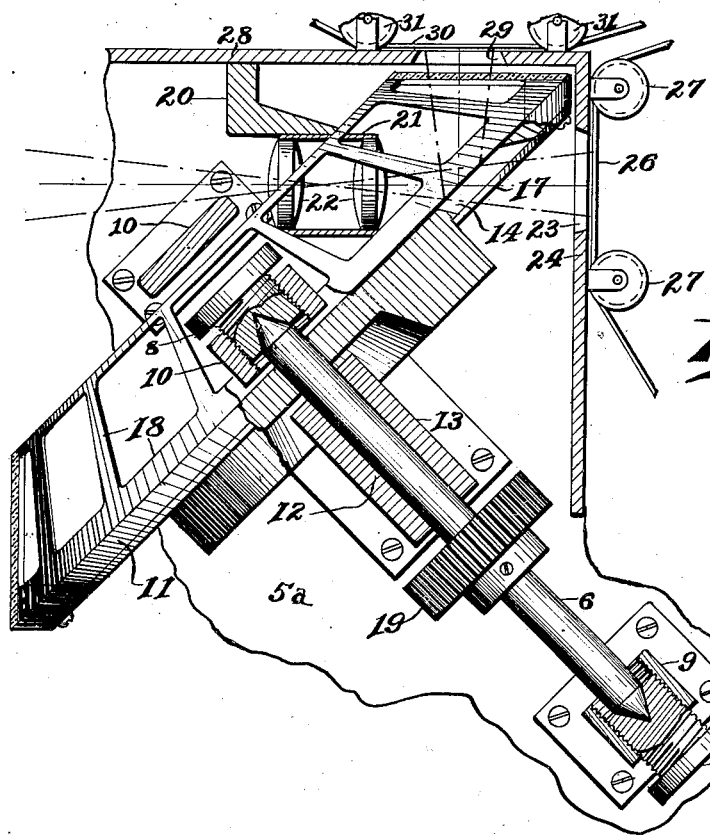
Fig.1
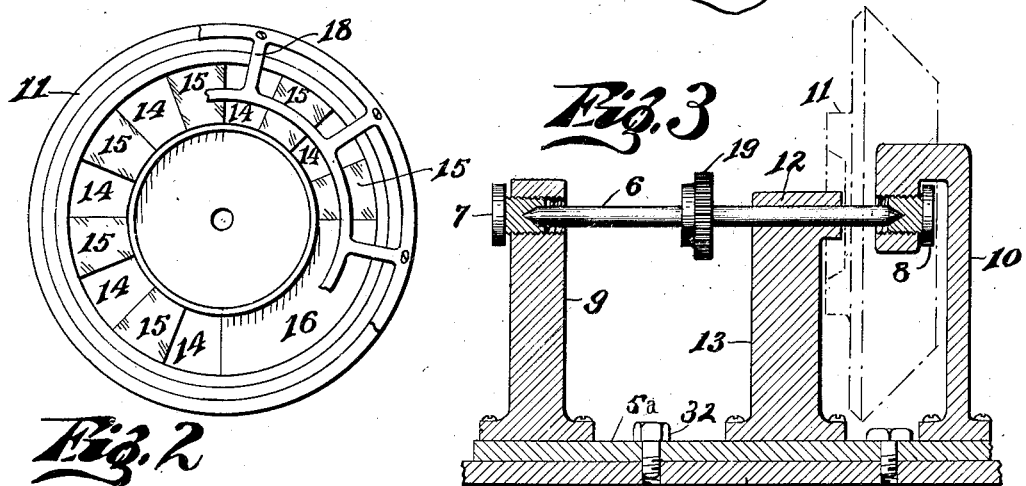
Fig.2
Fig.3
Milton M. Moore
Friend F. Baker
INVENTORS.
BY
Barpham
ATTORNEY.

Patented Dec. 15, 1925.

1,565,488

UNITED STATES PATENT OFFICE.

MILTON M. MOORE AND FRIEND F. BAKER, OF LOS ANGELES, CALIFORNIA.

MOVING-PICTURE CAMERA.

Application filed May 31, 1921. Serial No. 474,018.

*To all whom it may concern:*

Be it known that we, MILTON M. MOORE and FRIEND F. BAKER, both citizens of the United States, residing at the city of Los Angeles, Los Angeles County, State of California, have invented new and useful Improvements in Moving-Picture Cameras, of which the following is a specification.

Our invention relates to a camera for taking color pictures, and the object thereof is to produce a camera which will produce the same image on two different films in two different color values.

In the drawings forming a part of this application Fig. 1 is a side elevation of so much of our camera as is necessary to illustrate our invention, with parts in section. Fig. 2 is a front end elevation, with parts broken away, of the light dividing member, and connected parts. Fig. 3 is a detail showing the mounting of the main shaft.

Referring to the drawings 5 is the outer case in which is revolubly mounted shaft 6 in thrust bearings 7 and 8. These bearings are secured to supports 9 and 10 fastened to case 5 and can be adjusted to move shaft 6 endwise to position the light dividing member 11 which is rigidly mounted on shaft 6. Shaft 6 is further supported by bearing 12 secured in support 13 fastened to case 5. Member 11, as shown, has six openings 14 in its outer portion, and six intermediate and adjacent reflecting portions 15 which occupy three fourths of the distance around the face thereof. The remaining fourth of the surface is imperforate and is the nonreflecting surface 16. Secured to the rear face of member 11 is an annular plate 17 which holds the red filter film positioned when a color picture negative is being made. Secured to the front face of member 11 is an annular skeleton frame 18 which holds the green filter film positioned when a color picture negative is being made. Secured to shaft 6 is a driving gear 19 to which power is applied to rotate the shaft. Secured to case 5 is an arm 20 to which lens holder 21 is fastened. Holder 21 carries a lens 22 which projects the image through aperture 23 in the end 24 upon film 26 which passes over guide rollers 27 secured to case 5 when an opening 14 passes said aperture. In the top 28 is an aperture 29 and the image projected by lens 22 is deflected through aperture 29 by reflecting surfaces 15 when they pass in front of aperture 23 upon film 30 which passes over guide rollers 31 secured to case 5.

It will be understood that during the time the openings 14 and reflecting surfaces 15 are passing before the lens the films 26 and 30 remain stationary and when the nonreflecting surface 16 passes the lens both films are stepped up by appropriate mechanism now in use for moving films and no part of our invention. Shaft 6 is also rotated by suitable mechanism at a suitable speed to produce the desired effect for each stop.

By this construction it will be observed that the same image is projected upon two sensitized films at the same time practically as the movement of member 11 is timed to produce a continuous direct vision upon one film and a continuous reflected vision upon another film and each vision passes through a different filter whereby different color effects are produced in the two films, which can be superposed and printed, thereby producing colored pictures. While we have shown the filters carried by member 11 it is obvious that the filters could be mounted before the apertures. While we have shown the apertures in the top and end it is obvious that the apertures could be positioned in other parts of the case if placed in planes at right angles to each other and the light dividing member suitably mounted. While we have shown a revolving member having reflecting surfaces and apertures and a nonreflecting surface to control the image it is obvious that an oscillating reflecting surface could be used to deflect the image to one of the apertures and a shutter used to cut off the light while the films are stepped up. Plate 5ª can be adjusted by bolts 32 to change the angle of member 11 to the axis of the lens.

Having described our invention we claim:

1. A motion picture camera comprising a case having apertures in the end and top thereof; a revoluble shaft mounted in said case; a lens holder in said case; a lens in said holder adapted to project an image through the end aperture; a member mounted on said shaft; said member having a plurality of reflecting surfaces in the outer portion spaced by openings between the reflecting surfaces and a nonreflecting portion, said reflecting surfaces being adapted to deflect the image through the top aperture and the nonreflecting portion to prevent the image from passing through either aperture.

2. A motion picture camera comprising a case having apertures in the end and top thereof; a revoluble shaft mounted in said case; a lens holder in said case; a lens in said holder adapted to project an image through the end aperture; a member mounted on said shaft; said member having a plurality of reflecting surfaces in the outer portion spaced by openings between the reflecting surfaces and a nonreflecting portion, said reflecting surfaces being adapted to deflect the image through the top aperture and the nonreflecting portion to prevent the image from passing through either aperture; and film filter frames carried by said member having reflecting surfaces.

3. A motion picture camera comprising a case having apertures in the end and top thereof; a revoluble shaft mounted in said case; a lens holder in said case; a lens in said holder adapted to project an image through the end aperture; a member mounted on said shaft; said member having a plurality of reflecting surfaces in the outer portion spaced by openings between the reflecting surfaces and a nonreflecting portion, said reflecting surfaces being adapted to deflect the image through the top aperture and the nonreflecting portion to prevent the image from passing through either aperture; and means to adjust the position of said shaft endwise.

4. A motion picture camera comprising a case having apertures in the end and top thereof; a revoluble shaft mounted in said case; a lens holder in said case; a lens in said holder adapted to project an image through the end aperture; a member mounted on said shaft; said member having a plurality of reflecting surfaces in the outer portion spaced by openings between the reflecting surfaces and a nonreflecting portion said reflecting surfaces being adapted to deflect the image through the top aperture and the nonreflecting portion to prevent the image from passing through either aperture; and means to adjust the position of said shaft endwise; and means to adjust the revolvable member in an angular position to the axis of the lens.

In witness that we claim the foregoing we have hereunto subscribed our names this 22nd day of April, 1921.

MILTON M. MOORE.
FRIEND F. BAKER.